United States Patent [19]

Hasegawa et al.

[11] Patent Number: 4,745,576

[45] Date of Patent: May 17, 1988

[54] ADDRESS ASSIGNMENT SYSTEM FOR IMAGE MEMORY

[75] Inventors: Hirokazu Hasegawa; Hideki Kudoh; Takashi Aoki, all of Tokyo, Japan

[73] Assignee: Casio Computer Co., Ltd., Tokyo, Japan

[21] Appl. No.: 772,951

[22] Filed: Sep. 5, 1985

[30] Foreign Application Priority Data

Sep. 17, 1984 [JP] Japan .............................. 59-194395

[51] Int. Cl.⁴ .............................................. G06F 7/00
[52] U.S. Cl. ..................................... 364/900; 364/519
[58] Field of Search ... 364/200 MS File, 900 MS File, 364/519; 382/46

[56] References Cited

U.S. PATENT DOCUMENTS

| | | | |
|---|---|---|---|
| 3,898,627 | 8/1975 | Hooker et al. | 364/900 |
| 4,168,488 | 9/1979 | Evans | 382/46 |
| 4,267,573 | 5/1981 | Chaiken et al. | 382/46 |
| 4,271,476 | 6/1981 | Lotspiech | 382/46 |
| 4,593,407 | 6/1986 | Konishi et al. | 382/46 |
| 4,598,283 | 7/1986 | Tung et al. | 340/731 |
| 4,611,232 | 9/1986 | Searby | 382/46 |
| 4,627,020 | 12/1986 | Anderson et al. | 364/900 |
| 4,637,057 | 1/1987 | Kermisch | 382/46 |
| 4,658,428 | 4/1987 | Bedros et al. | 382/30 |
| 4,658,430 | 4/1987 | Anderson et al. | 382/46 |

FOREIGN PATENT DOCUMENTS 1050470 12/1966 United Kingdom .

OTHER PUBLICATIONS

IBM Technical Disclosure Bulletin, vol. 24, No. 11B, Apr. '82, pp. 5953-5954, "Print Rotation Technique".
IBM Technical Disclosure Bulletin, vol. 24, No. 4, Sep. '81, pp. 1938-1939, "Character Position Control Apparatus".

*Primary Examiner*—Gary V. Harkcom
*Assistant Examiner*—Randy W. Lacasse
*Attorney, Agent, or Firm*—Frishauf, Holtz, Goodman & Woodward

[57] ABSTRACT

According to an image memory address assignment system, a frame memory is divided into a plurality of blocks. Upper bits of the address of the frame memory constitute a block address, and lower bits constitute an intrablock address. The block address is supplied to an address converter. The address converter has a conversion pattern ROM. The conversion pattern ROM stores conversion patterns each converting the input write address signal block address to a block address for a completely read block area so as to perform simultaneous read and write access even if the data read direction (order) of the frame memory is different from the data write direction. The address converter supplies the write block address to the frame memory. As a result, the data can be written in the completely read block.

8 Claims, 15 Drawing Sheets

FIG. 6A

| 00 | 01 | 02 | 03 | 04 | 05 | 06 | 07 | 08 |
|----|----|----|----|----|----|----|----|----|
| 09 | 0A | 0B | 0C | 0D | 0E | 0F | 10 | 11 |
| 12 | 13 | 14 | 15 | 16 | 17 | 18 | 19 | 1A |
| 1B | 1C | 1D | 1E | 1F | 20 | 21 | 22 | 23 |
| 24 | 25 | 26 | 27 | 28 | 29 | 2A | 2B | 2C |
| 2D | 2E | 2F | 30 | 31 | 32 | 33 | 34 | 35 |
| 36 | 37 | 38 | 39 | 3A | 3B | 3C | 3D | 3E |

PATTERN 0

FIG. 6B

| 06 | 0D | 14 | 1B | 22 | 29 | 30 | 37 | 3E |
|----|----|----|----|----|----|----|----|----|
| 05 | 0C | 13 | 1A | 21 | 28 | 2F | 36 | 3D |
| 04 | 0B | 12 | 19 | 20 | 27 | 2E | 35 | 3C |
| 03 | 0A | 11 | 18 | 1F | 26 | 2D | 34 | 3B |
| 02 | 09 | 10 | 17 | 1E | 25 | 2C | 33 | 3A |
| 01 | 08 | 0F | 16 | 1B | 24 | 2B | 32 | 39 |
| 00 | 07 | 0E | 15 | 1C | 23 | 2A | 31 | 38 |

PATTERN 1

FIG. 6C

| 30 | 21 | 12 | 03 | 34 | 25 | 16 | 07 | 38 |
|----|----|----|----|----|----|----|----|----|
| 29 | 1A | 0B | 3C | 2D | 1E | 0F | 00 | 31 |
| 22 | 13 | 04 | 35 | 26 | 17 | 08 | 39 | 2A |
| 1B | 0C | 3D | 2E | 1F | 10 | 01 | 32 | 23 |
| 14 | 05 | 36 | 27 | 18 | 09 | 3A | 2B | 1C |
| 0D | 3E | 2F | 20 | 11 | 02 | 33 | 24 | 15 |
| 06 | 37 | 28 | 19 | 0A | 3B | 2C | 1D | 0 |

PATTERN 2

FIG. 6D

| 16 | 2D | 04 | 1B | 32 | 09 | 20 | 37 | 0B |
|----|----|----|----|----|----|----|----|----|
| 25 | 3C | 13 | 2A | 01 | 18 | 2F | 06 | 1D |
| 34 | 0B | 22 | 39 | 10 | 27 | 3E | 15 | 2C |
| 03 | 1A | 31 | 08 | 1F | 36 | 0B | 24 | 5B |
| 12 | 29 | 00 | 17 | 2E | 05 | 1C | 33 | 0A |
| 21 | 38 | 0F | 26 | 3D | 14 | 2B | 02 | 19 |
| 30 | 07 | 1E | 35 | 0C | 23 | 3 | 11 | 28 |

PATTERN 3

FIG. 6E

| 20 | 01 | 22 | 03 | 24 | 05 | 26 | 07 | 28 |
|----|----|----|----|----|----|----|----|----|
| 09 | 2A | 0B | 2C | 0D | 2E | 0F | 30 | 11 |
| 32 | 13 | 34 | 15 | 36 | 17 | 38 | 19 | 3A |
| 1B | 3C | 1D | 3E | 1F | 00 | 21 | 02 | 23 |
| 04 | 25 | 06 | 27 | 08 | 29 | 0A | 2B | 0C |
| 2D | 0E | 2F | 10 | 31 | 12 | 33 | 14 | 35 |
| 16 | 37 | 18 | 39 | 1A | 3B | 1C | 3D | 1E |

PATTERN 4

FIG. 6F

| 26 | 0B | 34 | 1B | 02 | 29 | 10 | 37 | 1E |
|----|----|----|----|----|----|----|----|----|
| 05 | 2C | 13 | 3A | 21 | 08 | 2F | 16 | 3D |
| 24 | 0B | 32 | 19 | 00 | 27 | 0E | 35 | 1C |
| 03 | 2A | 11 | 38 | 1F | 06 | 2B | 14 | 3B |
| 22 | 09 | 30 | 17 | 3E | 25 | 0C | 33 | 1A |
| 01 | 28 | 0F | 36 | 1D | 04 | 2B | 12 | 39 |
| 20 | 07 | 2E | 15 | 3C | 23 | 0A | 31 | 18 |

PATTERN 5

FIG. 6G

| 10 | 21 | 32 | 03 | 14 | 25 | 36 | 07 | 18 |
|----|----|----|----|----|----|----|----|----|
| 29 | 3A | 0B | 1C | 2D | 3E | 0F | 20 | 31 |
| 02 | 13 | 24 | 35 | 06 | 17 | 28 | 39 | 0A |
| 1B | 2C | 3D | 0E | 1F | 30 | 01 | 12 | 23 |
| 34 | 05 | 16 | 27 | 38 | 09 | 1A | 2B | 3C |
| 0D | 1E | 2F | 00 | 11 | 22 | 33 | 04 | 15 |
| 26 | 37 | 08 | 19 | 2A | 3B | 0C | 1D | 2E |

PATTERN 6

FIG. 6H

| 36 | 2D | 24 | 1B | 12 | 09 | 00 | 37 | 2E |
|----|----|----|----|----|----|----|----|----|
| 25 | 1C | 13 | 0A | 01 | 38 | 2F | 26 | 1D |
| 14 | 0B | 02 | 39 | 30 | 27 | 1E | 15 | 0C |
| 03 | 3A | 31 | 28 | 1F | 16 | 0D | 04 | 3B |
| 32 | 29 | 20 | 17 | 0E | 05 | 3C | 33 | 2A |
| 21 | 18 | 0F | 06 | 3D | 34 | 2B | 22 | 19 |
| 10 | 07 | 3E | 35 | 3C | 23 | 1A | 11 | 08 |

PATTERN 7

FIG. 10

| RY·D | XWD·D | YWD·D |
|---|---|---|
| 0 ~ 511 | 0 | 0 |
| 512 ~ 1023 | 511 | 2560 |
| 1024 ~ 1535 | 767 | 1536 |
| 1536 ~ 2047 | 1023 | 512 |
| 2048 ~ 2559 | 1535 | 3072 |
| 2560 ~ 3071 | 1791 | 2048 |
| 3072 ~ 3583 | 2047 | 1024 |

M·ROM 14

F I G. 12
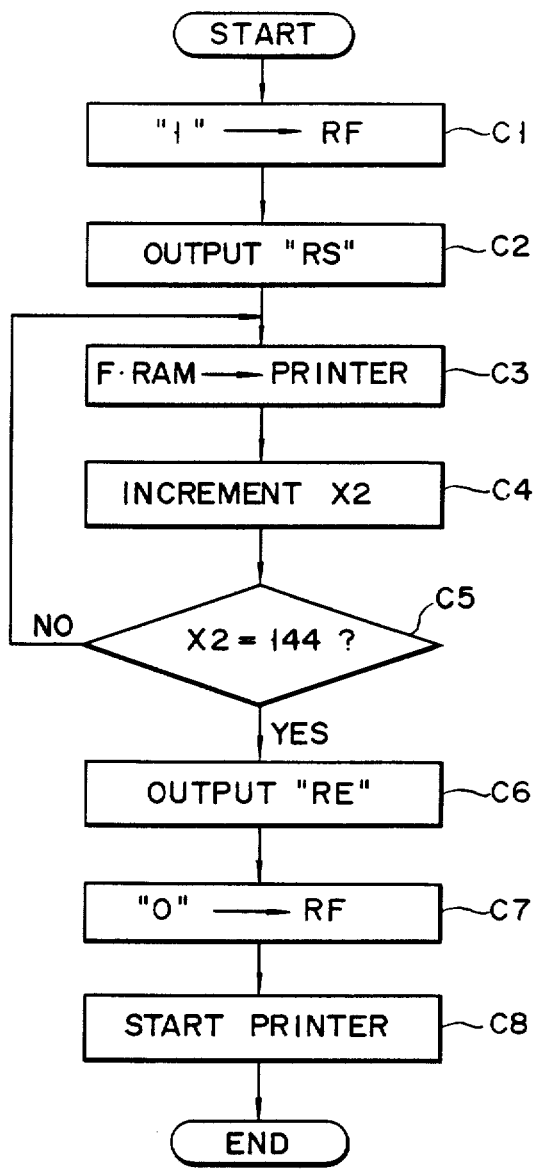

F I G. 13
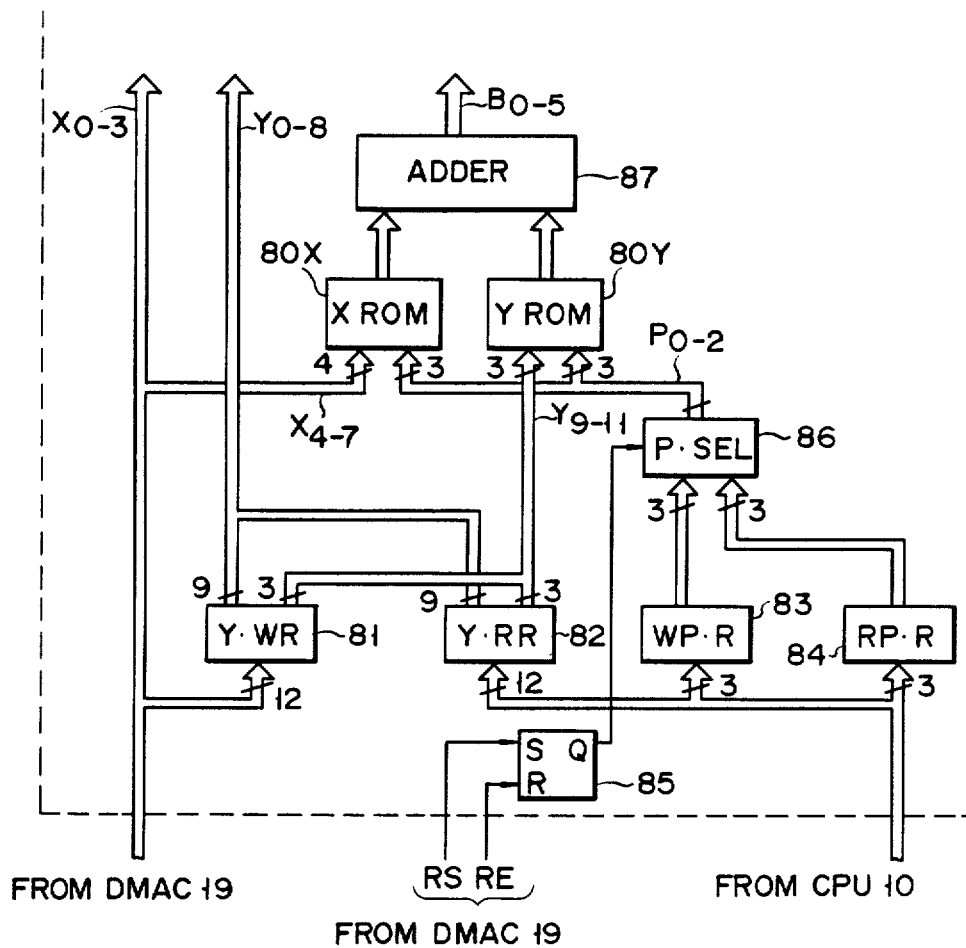

FIG. 14

| P0~2 / X4~7 | 0 | 1 | 2 | 3 | 4 | 5 | 6 | 7 |
|---|---|---|---|---|---|---|---|---|
| 0 | 00 | 00 | 00 | 00 | 00 | 00 | 00 | 00 |
| 1 | 01 | 07 | 31 | 17 | 21 | 27 | 11 | 37 |
| 2 | 02 | 0E | 22 | 2E | 02 | 0E | 22 | 2E |
| 3 | 03 | 15 | 13 | 05 | 23 | 35 | 33 | 25 |
| 4 | 04 | 1C | 04 | 1C | 04 | 1C | 04 | 1C |
| 5 | 05 | 23 | 35 | 33 | 25 | 03 | 15 | 13 |
| 6 | 06 | 2A | 26 | 0A | 06 | 2A | 26 | 0A |
| 7 | 07 | 31 | 17 | 21 | 27 | 11 | 37 | 01 |
| 8 | 08 | 38 | 08 | 38 | 08 | 38 | 08 | 38 |

X·ROM (80X) TABLE

FIG. 15

| P0~2 / Y9~11 | 0 | 1 | 2 | 3 | 4 | 5 | 6 | 7 |
|---|---|---|---|---|---|---|---|---|
| 0 | 00 | 06 | 30 | 16 | 20 | 26 | 10 | 36 |
| 1 | 09 | 05 | 29 | 25 | 09 | 05 | 29 | 25 |
| 2 | 12 | 04 | 22 | 34 | 32 | 24 | 02 | 14 |
| 3 | 1B | 03 | 1B | 03 | 1B | 03 | 1B | 03 |
| 4 | 24 | 02 | 14 | 12 | 04 | 22 | 34 | 32 |
| 5 | 2D | 01 | 0D | 21 | 2D | 01 | 0D | 21 |
| 6 | 36 | 00 | 06 | 30 | 16 | 20 | 26 | 10 |

Y·ROM (80Y) TABLE

ADDRESS ASSIGNMENT SYSTEM FOR IMAGE MEMORY

BACKGROUND OF THE INVENTION

The present invention relates to an address assignment system for an image memory (e.g., a frame memory of a page printer) for processing image data in page units.

A conventional page printer prints character data in units of one page. When image data is transferred to a conventional page printer, the image data is temporarily stored in a frame memory. When the frame memory stores one-page image data, the one-page image data is supplied to the page printer.

A conventional page printer must deal with a large number of image data in page units, and the frame memory must therefore have a large memory capacity. For this reason, in a conventional system, a one-page frame memory is prepared, and an input from the host computer to the frame memory and an output from the frame memory to the page printer are alternately repeated. More specifically, one-page image data is transferred from the host system to the frame memory, and after the transferred data is supplied to the printer, the next one-page image data is transferred from the host system to the frame memory again. This one-page image data is transferred to the printer, and the next one-page image data is supplied from the host system to the frame memory.

In such a conventional printing control means, the next one-page image data cannot be written in the frame memory while the current one-page image data is being printed. Therefore, the next one-page image data cannot be written until the current one-page image data is completely printed. As a result, printing time is prolonged and high-speed, high-efficiency printing cannot be performed.

As shown in FIG. 1A, if a data write direction (CW) from the host system is always the same as the data output direction (Pout) to the page printer, the next one-page image data can be sequentially written in the data memory area while the current one-page image data is being transferred to the page printer. However, as shown in FIG. 1B, when the write direction (CW) is different from the read direction (Pout), the next one-page image data must be written after the current one-page image data is completely transferred to the page printer. Therefore, the overall printing time is prolonged.

In order to solve this problem, a double frame memory configuration has been proposed. Data is written in one frame memory, while the data is being transferred from the other frame memory to the page printer. However, two expensive large-capacity frame memories must be used, greatly increasing the product cost, and leading to an impractical configuration.

SUMMARY OF THE INVENTION

It is an object of the present invention to provide an address assignment system of an image memory for a page printer for processing image data in units of one page, wherein the next one-page image data can be written in a read end area while the current one-page image data is being transferred to the page printer even when the image data write direction is different from the image data read direction, thereby effectively utilizing the one-page image memory so as to perform high-speed printing with a simple configuration.

In order to achieve the above object of the present invention, there is provided an image memory address assignment system comprising:

page data storage means divided into a plurality of block areas each of which is accessed such that upper bits of an address signal designate a block address and lower bits thereof designate an intrablock address, the page data storage means being arranged to store at least one-page data;

means for generating read address signals so as to read out the one-page data from the page data storage means;

means for generating write address signals to write the one-page data, the write address signals being generated in an order different from that of the read address signals;

block address converting means, arranged between said page data storage means, said read address signal generating means and said write address signal generating means, for receiving as a block address upper bits of the read and write address signals and generating a block address in accordance with a conversion pattern for converting the block address of the input write address signal to a block address of a completely read block area;

write conversion pattern designating means, connected to said block address converting means, for designating a conversion pattern for converting the block address of the write address signal to the block address of the completely read block area;

read conversion pattern designating means, connected to the block address converting means, for designating another conversion pattern for converting the block address of the read address signal to another block address; and means for printing the data read out from the page data storage means.

BRIEF DESCRIPTION OF THE DRAWINGS

Other objects and features of the present invention will be apparent from the following description taken in connection with the accompanying drawings, in which:

FIGS. 6A through 6H are tables showing each page block conversion pattern in a block address conversion ROM 70 of FIG. 5;

FIG. 10 is a table in a main ROM 14 for checking the possible write area in the system of FIG. 2;

FIGS. 11 and 12 are respectively flowcharts for explaining image data transfer operations at the CPU and DMA controller in the system of FIG. 2;

FIG. 13 is a block diagram showing an address converter according to another embodiment of the present invention; and FIGS. 14 and 15 are tables showing output data values in the conversion ROM of FIG. 13.

DETAILED DESCRIPTION OF THE PREFERRED EMBODIMENTS

Figure 2:
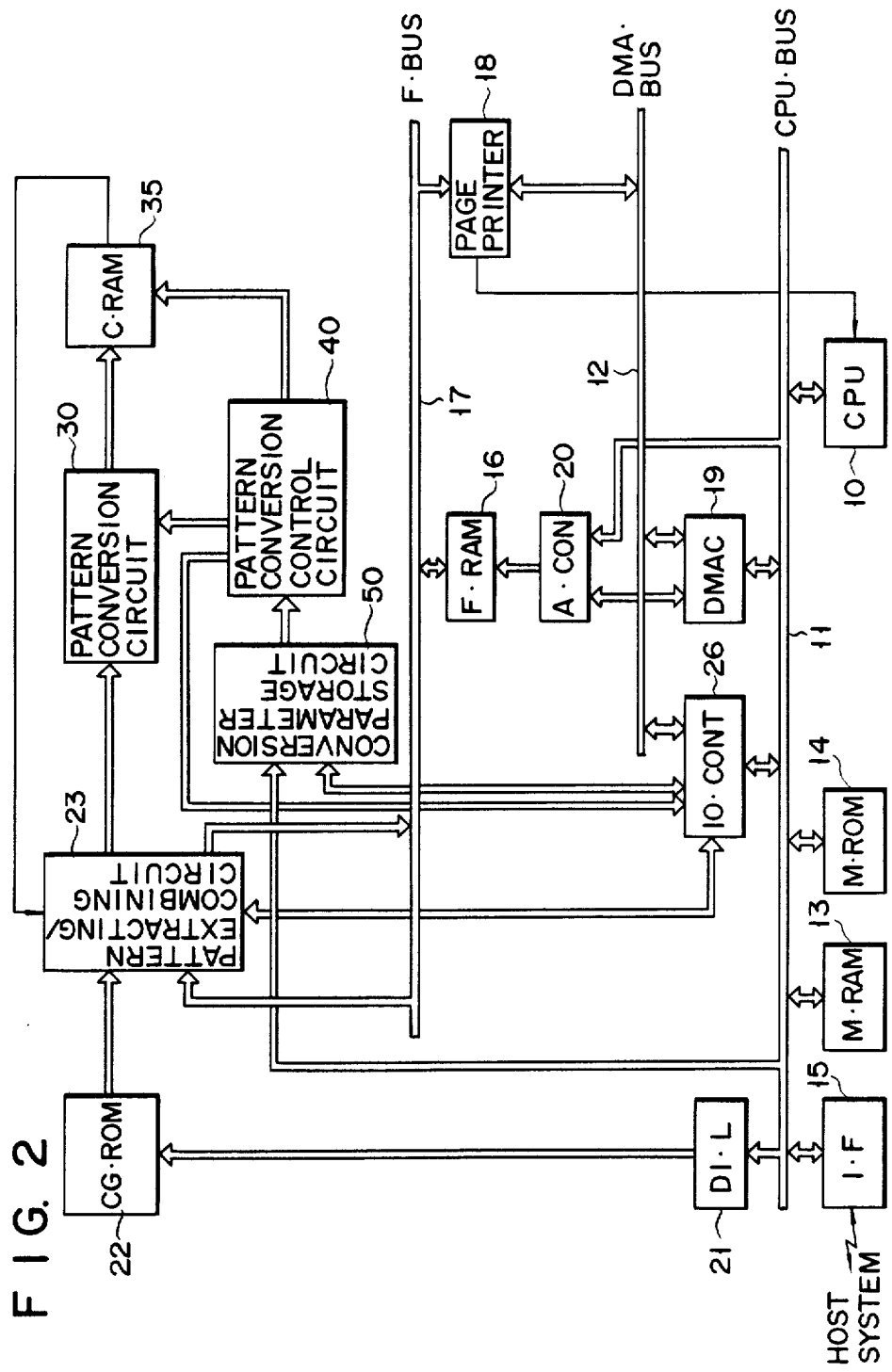
FIG. 2 is a block diagram showing a page memory address assignment system according to an embodiment of the present invention.

An address assignment system according to an embodiment will be described with reference to the accompanying drawings. FIG. 2 is a block diagram showing a hardware configuration when a pattern data write control system is applied to a page printer control system.

A central processing unit (CPU) 10 controls the printer control system as a whole. A CPU bus (CPU-BUS) 11 controls data transfer between the CPU 10 and the respective units connected to the bus 11. A DMA bus (DMA-CONBUS) 12 is used for data transfer using a direct memory access (DMA) unit 19. A main random-access-memory (RAM) (M·RAM) 13 is connected to the CPU 10 through the bus 11 and stores various types of data. A main read only memory (ROM) (M·ROM) 14 is connected to the CPU 10 through the bus 11 and stores control programs shown in flowcharts of FIGS. 8A through 8C, 11 and 12. An interface (I/F) 15 is connected to the CPU 10 through the bus 11 and controls transfer of printing data and printing control data between the CPU 10 and a host computer (HOST).

A frame memory (F·RAM) 16 has a 1-Mbyte memory capacity and stores one-page image data. The memory 16 is segmented into k × i blocks each having a predetermined unit memory capacity (to be described in detail later). A frame memory bus (F·BUS) 17 has a 2-byte data width, and image data are transferred to/from the memory 16 through the bus 17. A page printer 18 prints the data read out from the memory 16 in page units. A DMA controller (DMAC) 19 accesses the memory 16 when data is transferred to the printer 18. An address converter (A·CON) 20 receives a read address (DMA address) from the controller 19 and a write address (CPU address) from the CPU 10, and transforms these addresses into units of division blocks of the memory 16. The converter 20 will be described in detail later.

A data latch (DI·L) 21 latches one-character code or image data of interest through the interface 15. A character generator (CG·ROM) 22 generates a character pattern corresponding to the character code latched by the latch 21.

A pattern extracting/combining circuit 23 extracts or combines the dot pattern data generated from the generator 22 or the image data latched by the latch 21.

An input/output controller (IO·CONT) 26 exchanges various control signals such as an initial set end signal (I·END) with the CPU 10 and the controller 19, and controls pattern conversion and pattern development into the memory 16.

A pattern conversion circuit 30 performs conversion operations (e.g., 4/3 times elongation conversion, 90° conversion, 180° conversion, 2y (double longitudinal length) conversion) of a dot pattern supplied from the circuit 23.

A pattern conversion control circuit 40 controls the timing and the addresses for the circuit 30 when the circuit 30 performs conversion operations such as 4/3 elongation conversion, 90° conversion, 180° conversion and 2y (double longitudinal length) conversion.

A conversion parameter storage circuit 50 stores conversion parameters supplied to the circuit 40 which can control conversion operations such as 4/3 elongation conversion, 90° conversion, 180° conversion and 2y conversion.

Figure 3:
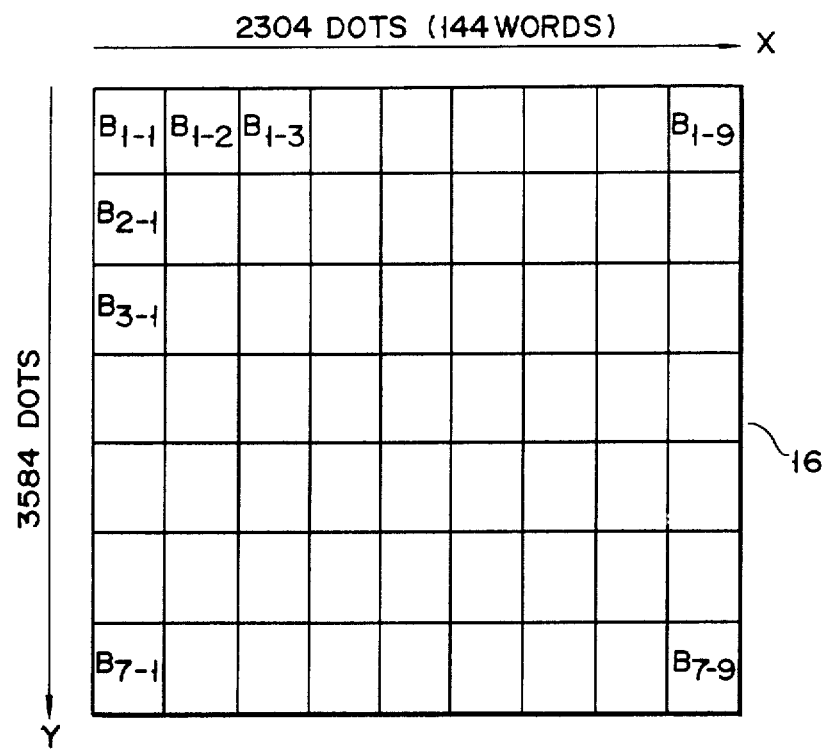
FIGS. 3 and 4 are block diagrams showing a frame memory of FIG. 2.
Figure 4:
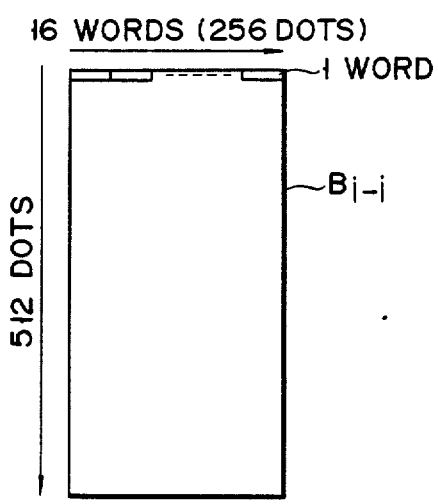

The image memory address assignment system of this embodiment will be described in detail with reference to FIGS. 3 through FIG. 12. FIG. 3 shows the detailed block configuration of the frame memory 16, and FIG. 4 shows a one-block format. The memory 16 has a total dot memory pattern area of $X \cdot Y = 2304 \times 3584$ dots, and each block (Bi-j) has an area of $X \cdot Y = 256 \times 512$ dots, so that the memory 16 is divided into $X \cdot Y = 9 \times 7$ blocks.

Figure 5:
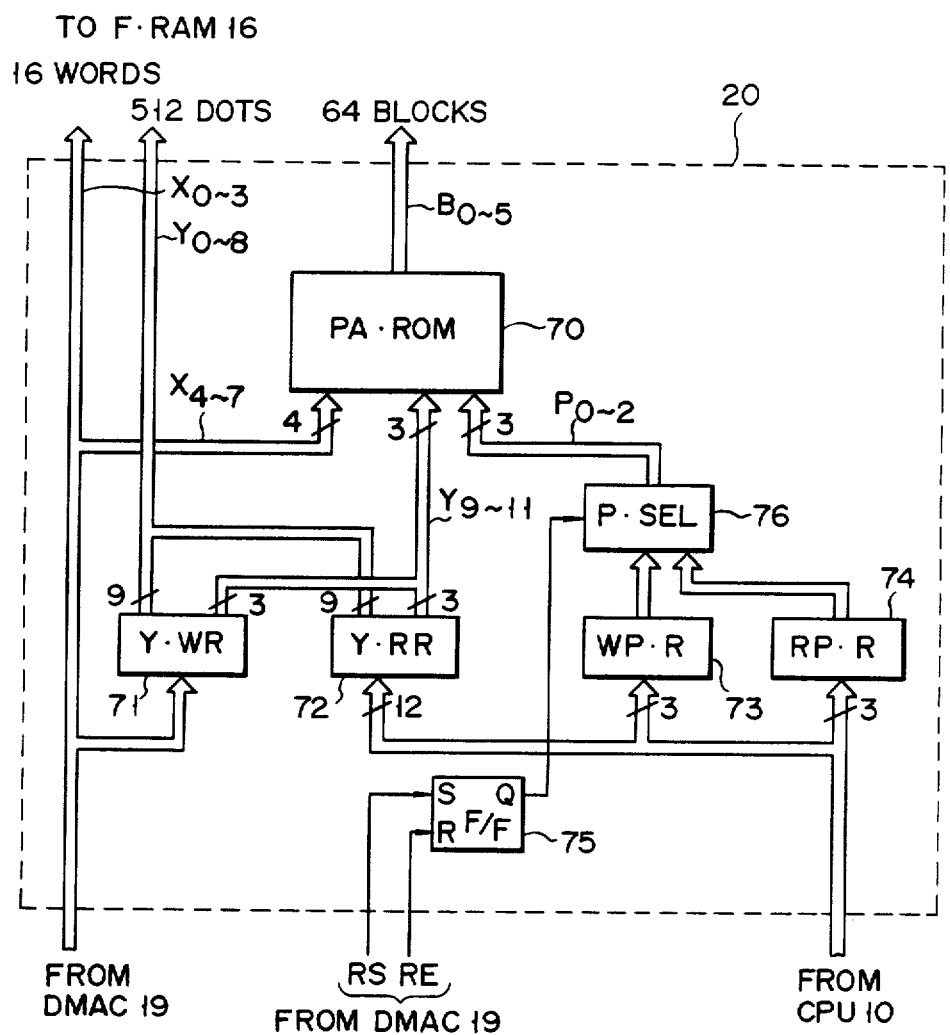
FIG. 5 is a block diagram showing an address converter 20 of FIG. 2.

FIG. 5 shows the detailed arrangement of the address converter 20. A block address conversion ROM 70 stores 8-page (page 0 through page 7) block conversion patterns. A one-page block conversion pattern is shown in FIGS. 6A through 6H in detail. A Y write address register (Y·WR) 71 and a write page designation register (WP·R) 73 store addresses for write image data in the memory 16.

A Y read address register (Y·RR) 72 and a read page designation register (RP·R) 74 store the addresses for reading out the image data from the memory 16. A flip-flop (F/F) 75 is set in response to a read start signal (RS) which represents frame memory read access and which is supplied from the controller 19. The flip-flop 75 is reset in response to a read end signal (RE) representing an end of one-line data transfer to the printer 18. A page address selector (P·SEL) 76 selects an output from the register 74 when the flip-flop 75 is set. However, when the flip-flop 75 is reset, the selector 76 selects the output from the register 73. A 3-bit page designation address (P0 through P2) generated from the selector (P·SEL) 76, a 3-bit Y block designation address (Y9 through Y11) for designating a block along the Y direction, and a 4-bit X block designation address (X4 through X7) for designating a block along the X direction are used to read-access the ROM 70. The read or write block address is updated in accordance with the read or write mode of the memory 16.

Figures 7, 9:
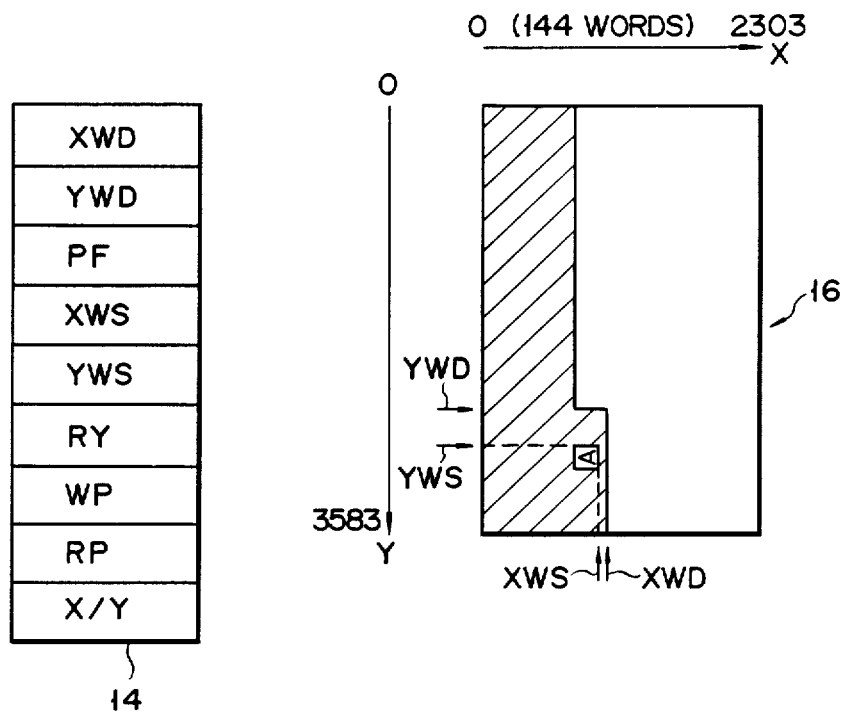
FIG. 7 is a diagram showing various registers used for frame memory access control in a main RAM of FIG. 2.
FIG. 9 is a diagram showing the state of a possible write area in the system of FIG. 2.

FIGS. 7 through 12 are views for explaining write area control and data read/write of the memory 16. Referring to FIG. 7, registers XWD and YWD show possible write areas of the memory 16. A print flag PF is set at logic 37 1" during printing. Registers XWS and YWS indicate a current write start position of the memory 16. A register RY indicates a read position (Y dot position) of the memory 16. Registers WP and RP indicate the write and read pages, respectively. A signal X indicates a printing format in which a character string direction is parallel to the printing direction. A signal Y indicates a printing format in which the character string direction is perpendicular to the printing direction. Reference symbol X2 denotes an X address counter in the controller 19.

Figure 8A:
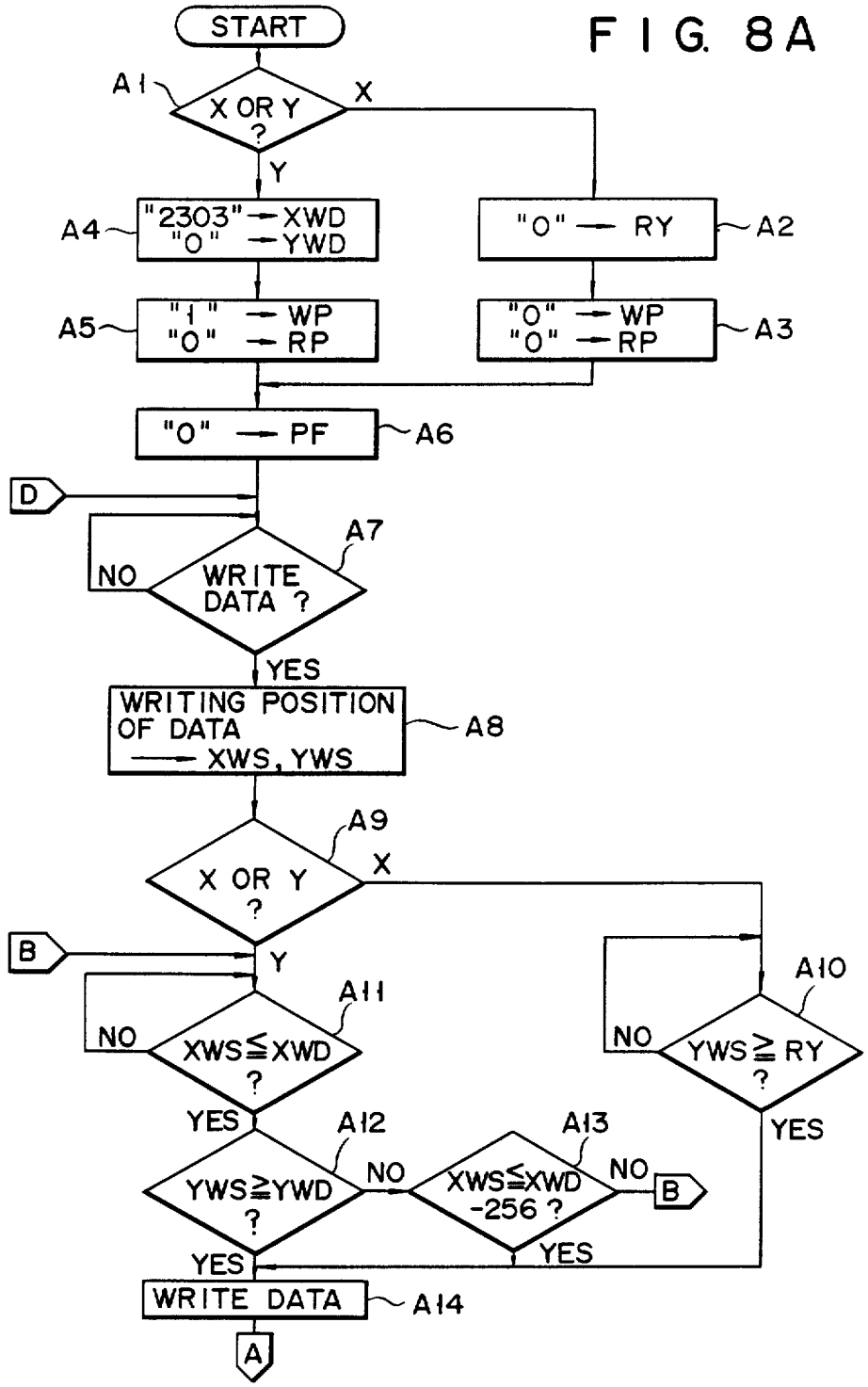
FIGS. 8A through 8C are flowcharts for explaining the CPU operation for frame memory write area control of the system shown in FIG. 2.
Figure 8B:
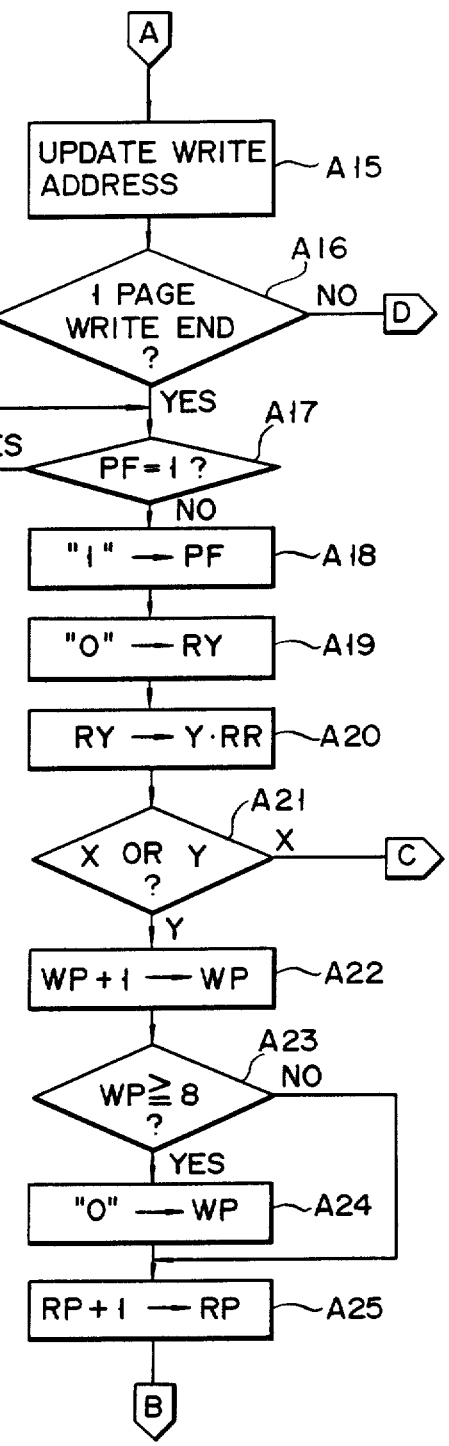
Figure 8C:
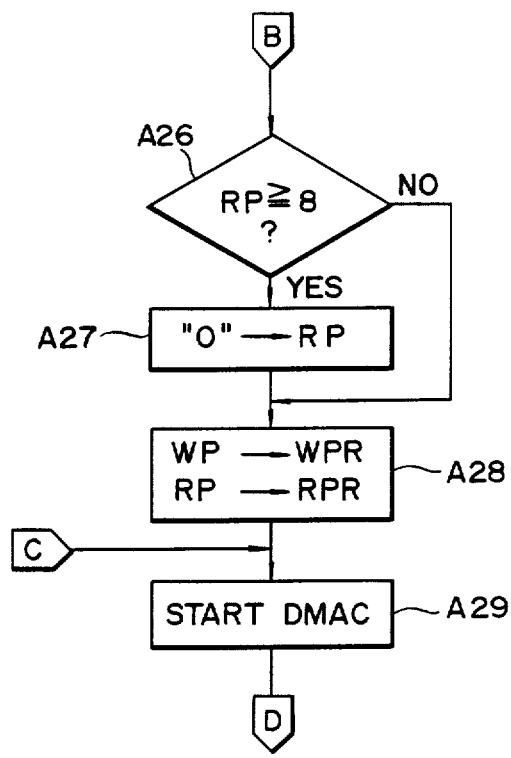
Figure 11:
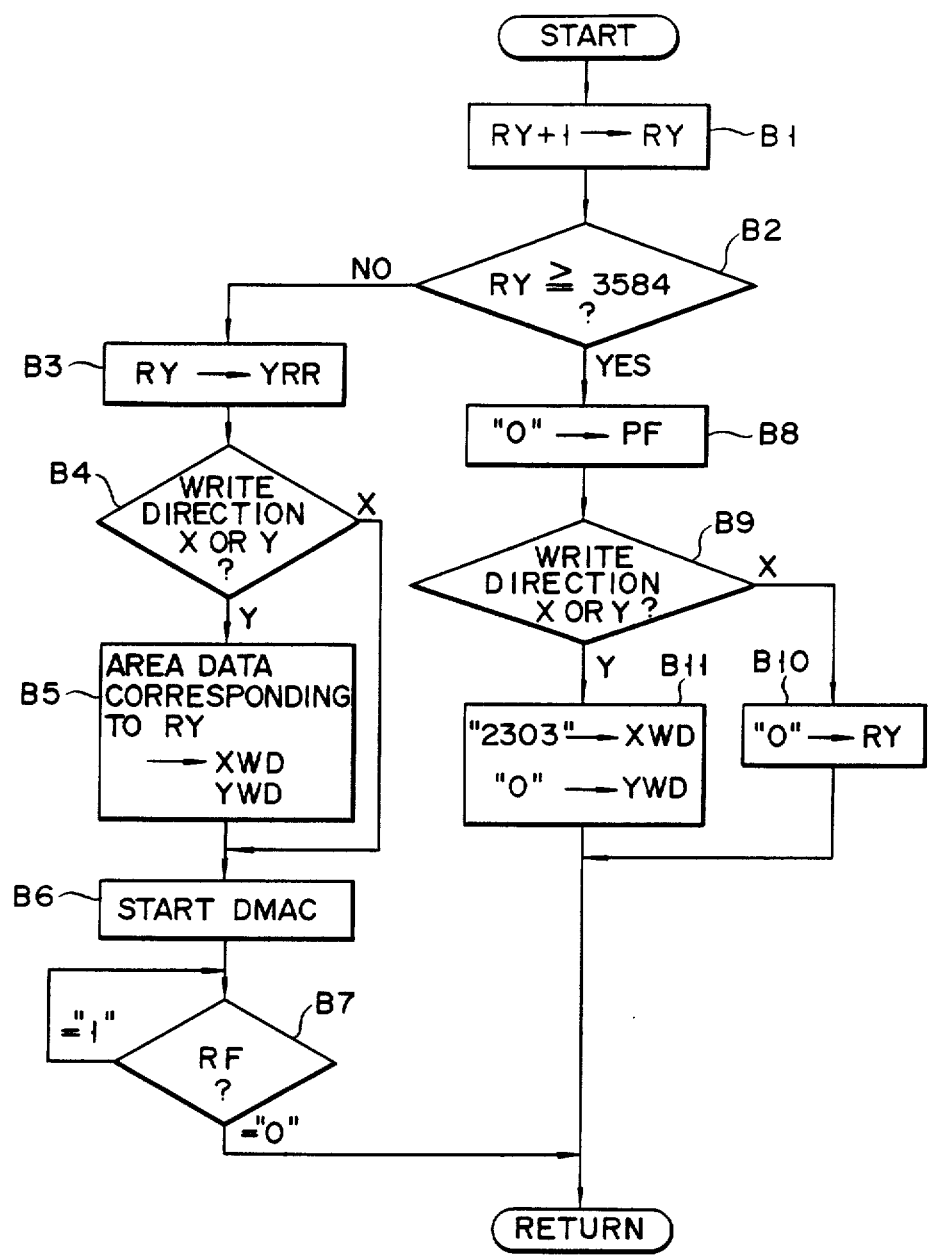

The memory 16 has 9×7 blocks each with 256×512 dots. When the order of read addresses for reading out the data of the memory 16 is different from that of write addresses in a given relationship under the control of the CPU 10, the converter 20 supplies the corresponding read and write addresses in corresponding orders to the memory 16. The given relationship indicates that the data read direction in the memory 16 is given by an arrow Pout and the data write direction is given by an arrow CW, or that the read direction is given by the arrow CW and the write direction is given by the arrow Pout. It is essential that the data read direction be different from the data write direction. When pattern data is written in the memory 16 in units of one character, a possible write area is determined. When a data read end area from which data is transferred to the printer 18 exceeds a given area, the next page data is written in the possible write area. Write area control and read/write access of the memory 16 are shown in FIGS. 7 through 12 in detail. FIGS. 8A through 8C show the CPU operation for write area control. The CPU 10 uses the working registers (XWD, YWD, PF, XWS, YWS, RY, WP, RP, X/Y, etc.) of the ROM 14 and a table shown in FIG. 10 to identify the possible write area (a hatched area in FIG. 9).

Figure 1A:
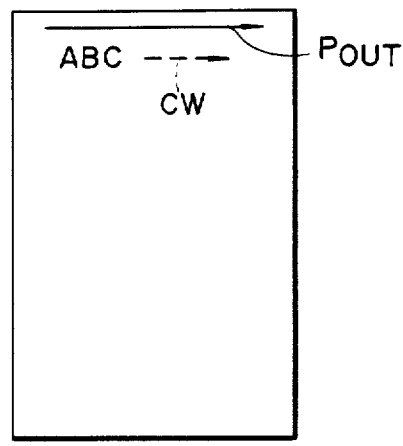
FIGS. 1A and 1B are illustrative representations for explaining conventional printing formats.
Figure 1B:
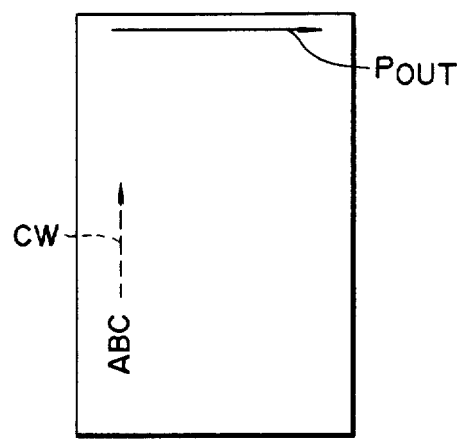

As shown in FIG. 8A, the CPU 10 checks in step A1 whether a direction (i.e., an order) of data read from the memory 16 is the same (X) as that of data write therein or perpendicular (Y) thereto (FIGS. 1A and 1B). If the order of the data read from memory 16 is determined to be X (the same as shown in FIG. 1A), the CPU 10 clears ("0") the register RY representing the read position of the memory 16 in step A2. In step A3, the CPU 10 clears ("0") the register WP representing the write page and the register RP representing the read page. In step A6, the CPU 10 clears the flag PF. The CPU 10 then checks in step A7 whether or not the write data is stored in the RAM 13. On the other hand, when the CPU 10 determines that the read direction is perpendicular to the direction (Y) of the write data, as shown in FIG. 1B, the CPU 10 sets an initial value (2303 dots which represent a maximum area) in the registers XWD and YWD representing the possible write area in step A4. In step A5, the register WP is set at logic "0", and the register RP is set at logic "0". Thereafter, the operations in steps A6 and A7 are performed. When the CPU 10 determines in step 7 that the data is stored in the RAM 13, its write position is set in the registers XWS and YWS in step A8. The CPU 10 checks in step A9 whether the direction of data read from the memory 16 is the same (X) as that of data write therein or perpendicular (Y) thereto. When the CPU 10 determines that the read direction is the same (X) as the write direction, the value of the register YWS is compared with that of the register RY in step A10 so as to check whether or not the write position exceeds the read position. If NO in step A10, the write data stored in the RAM 13 is transferred to the pattern conversion mechanism. The converted pattern data is written in the memory 16. More specifically, the data stored in the RAM 13 is latched by the latch 21, the conversion mode information is stored in the circuit 50, and the I-END signal is supplied to the controller 26 which manages the subsequent control. The controller 26 converts the one-character data stored in the latch 21 in accordance with the conversion mode information stored in the circuit 50. In this manner, the controller 26 controls the writing of the one-character pattern data in the memory 16. When the CPU 10 determines in step A9 that the write direction is perpendicular (Y) to the read direction, the value of the register XWS is compared with that of the register XWD. The CPU 10 compares the value of the register YWS with that of the register YWD in step A12. Furthermore, the CPU 10 compares the value of the register XWS with the value (XWD−256) (the number of dots of one block along the X direction; 16 words) in step A13. In this manner, the CPU 10 checks whether or not the write position falls within the possible write area. If YES in steps A11 and A12 or A13, the data is written in the memory 16 in step A14. If NO, the control returns to step A11 and the CPU 10 waits until the write operation is enabled.

When a one-character pattern is written, the write address is updated in accordance with the designated format in step A15. The CPU 10 checks in step A16 whether or not one-character data is written in the memory 16. The CPU 10 checks in step A17 whether or not the content of the flag PF represents in-printing (i.e., PF = "1"). If NO in step A17, the flag PF is set at logic "1" in step A18. In step A19, the content of the register RY is cleared ("0"). The content of the register RY is set in the register (Y·PR) 72 in step A20. The CPU 10 checks in step A21 whether the read direction of data from the memory 16 is the same (X) as that of the data write therein or perpendicular (Y) thereto. When the CPU 10 determines that the write direction is the same (X) as the read direction, the controller 19 is initialized in step A29, and DMA processing is started. However, when the CPU 10 determines that the write direction is perpendicular (Y) to the read direction, the content of the register WP is incremented by one in step A22. The CPU 10 then checks in step A23 whether or not the updated content of the register WP has reached the 8th page. If YES in step A23, the content of the register WP is reset to "0"(page 0) in step A24. The content of the register RP is incremented by one in step A25. The CPU 10 then checks in step A26 whether or not the content of the register RP has reached the 8th page. If YES in step A26, the content of the register RP is reset to "0"(page 0) in step A27. The content of the register WP is set in the register (WP·R) 73 and the content of the register RP is set in the register (RP·R) 74 in step A28. The controller 19 is initialized in step A29. The operation for transferring the image data (dot pattern data) from the memory 16 to the printer 18 will be described in detail with reference to FIGS. 11 and 12. The CPU 10 performs the printing data transfer operation of FIG. 11 until one-line (144 words) data is printed at the printer 18. When the CPU 10 receives a print end interrupt signal from the printer 18 upon completion of one-line printing, the content of the register RY representing the read position of the memory 16 is incremented by one in step B1. The CPU 10 then checks in step B2 whether or not the updated content of the register RY has reached a one-page line number (3584 dots as shown in FIG. 3). If NO in step B2, the content of the register RY is set in the register (Y·RR) 72 in step B3. The CPU 10 checks the designated direction (X/Y direction) of data written in the memory 16 in step B4. When the CPU 10 determines that the write direction is perpendicular (Y) to the read direction, the area data corresponding to the value of the register RY is set in the registers XWD and YWD representing the possible write area (FIG. 10) in step B5. In step B6, the DMA controller 19 is initialized (FIG. 12). In step B7, the CPU 10 checks the logic state of the flag RF and waits until the flag RF is reset to logic "0". However, if YES in step B2, the flag RF is set to logic "0"in step B8. The CPU 10 checks the write direction (X/Y direction) in step B9. When the CPU 10 determines that the write direction is the same (X) as the read direction, the content of the register RY is reset to "0"in step B10. However, when the CPU 10 determines that the write direction is perpendicular (Y) to the read direction, the maximum possible write area is set in the registers XWD and YWD in step B11. The DMA controller 19 is initialized by the CPU 10 every time one-line printing is completed. As a result, one-line data transfer shown in FIG. 12 is executed. Upon reception of a DMAC instruction from the CPU 10, transfer operation is started. In step C1, the flag RF is set at logic "1". In step C2, the read start signal (RS) is supplied to the address converter 20. In step C3, the data is transferred from the memory 16 to the buffer of the printer 18. In step C4, the content of the counter X2 is incremented by one. The DMA controller 19 checks in step C5 whether or not the updated count of the counter X2 has reached a one-line data transfer word (144 words). If YES (i.e., X2=144) in step C5, the read end signal (RE) is generated by the DMA controller 19 in step C6. The flag RF is reset ("0") in step C7. In step C8, the DMA controller 19 supplies a print start designation signal to the printer 18. The printer 18 prints out the data every time one-line image data (dot pattern data) is received by the line buffer therein.

The next page image data can be written in the read area while the current one-page image data is transferred from the memory 16 to the printer 18. Although the frame memory has only a one-page memory capacity, the frame memory can be effectively utilized to perform high-speed printing without idle time at low cost.

FIG. 13 shows an address converter according to another embodiment of the present invention. Although the page address conversion mechanism of the first embodiment comprises one address conversion ROM 70, the page address conversion mechanism of this embodiment comprises an X page address conversion ROM 80X, a Y page address conversion ROM 80Y and an adder 87 so as to reduce the ROM capacity. The input/output patterns of the ROM 80X are illustrated in FIG. 14, and input/output patterns of the ROM 80Y are illustrated in FIG. 15. Components 81 through 86 of FIG. 13 correspond to the address converter 20 of FIG. 5. Reference numeral 81 denotes a Y write address register (Y·WR); 82, a Y read address register (Y·RR); 83, a write page designation register (WP·P); 84, a read page designation register (RP·R); 85, a flip-flop; and 86, a page address selector (P·SEL). In this embodiment, the values of the respective patterns shown in FIGS. 6A through 6H are shown in the X·ROM and Y·ROM tables of FIGS. 14 and 15. A value for x=1 and y=1 of conversion pattern 1 is "0C". In the embodiment shown in FIGS. 13 through 15, the value "0C" is combined in the following manner. In the X·ROM table of FIG. 14, a value for P0-2 and X4-7 is "07". In the Y·ROM table of FIG. 15, a value for P0-2 and Y9-11 is "05". The values "07" and "05" are added by the adder 87 of FIG. 13, and the sum is given as "0C".

What is claimed is:

1. An image memory address assignment system having a printer and operated such that a block address is accessed by upper bits of an address signal and an intrablock address is accessed by lower bits thereof, comprising:
page data memory means having a plurality of block areas for storing at least one-page data;
means for supplying a read address to said page data storage means and readout data to said printer;
means for detecting whether or not data read access of each block in said page data storage means is completed and supplying the data and a write address to completely read block areas so as to write the data therein; and
block address converting means for receiving as a block address the upper bits of the read and write addresses, converting block addresses to different block addresses, respectively, and supplying said different block addresses to said page data storage means;
read address conversion designating means, coupled to said block address converting means, for designating the conversion of the read address signals during a period in which the read out data is supplied to said printer; and
write address conversion designating means, coupled to said block address converting means, for designating the conversion of the write address signals during a period different from a period in which the read out data is supplied to said printer.

2. An image memory address assignment system with printing means, comprising:
page data storage means for storing at least one-page data, said page data storage means being divided into a plurality of block areas;
means for generating a read address so as to read out the data from said page data storage means and for supplying readout data to said printing means;
data writing means for generating write addresses in a specific order different from that of the read addresses and writing the data in completely read blocks of said page data storage means; and
block address converting means for converting a current write address block designation order to an immediately preceding read address block designation order, and a current read address block designation order to a specific order with respect to an immediately preceding write address block designation order.

3. A system according to claim 2, wherein said block address converting means comprises: means for storing conversion patterns of the write address block designation order; and means for storing conversion patterns of the read address block designation order.

4. A method of assigning addresses of an image memory in a system having storage means for storing at least one-page data and operated such that a read address designation order upon reading of the data from said storage means is different in a specific relationship from a write address designation order upon writing of the data in said storage means, comprising the steps of:
(a) sequentially reading out the data from said storage means in response to the read address designation order;
(b) converting the write address designation order to be the same as the read address designation order;
(c) writing the data in a completely read area in said storage means in response to a converted write address and repeating the writing until one-page data is written in said storage means;
(d) converting the read address designation order in accordance with the specific relationship to the write address designation order when one-page data is completely written in said storage means; and
(e) repeating the steps (a) through (d).

5. An image memory assignment system, comprising:
page data storage means divided into a plurality of block areas each of which is accessed so that upper bits of an address signal designate a block address and lower bits of the signal designate an intrablock address, said page data storage means being arranged to store at least one-page data;

means for printing the page data when read out from said page data storage means;

means for generating, in accordance with a printing operation of the printing means, read address signals in specific order for reading data, during a plurality of transfer operation periods in which the one-page data in said page data storage means are divided into a plurality of sections and then sequentially transferred to the printing means;

means for generating write address signals in a period different from the transfer operation periods, in order to write data in a block area in said page data storage means for which a read operation is completed, the write address signals being generated in an order different from that of the read address signals;

block address converting means, arranged between said page data storage means, said read address signal generating means and said write address signal generating means, for converting a block address of address signals which are output from said read address signal generating means and said write address signal generating means in different predetermined orders, so that the block address of a read address signal is converted into a block address for sequentially specifying block areas for which a write operation has been completed, and the block address of a write address signal is converted into a block address for sequentially specifying block areas for which a read operation has been completed;

read address conversion designating means, coupled to said block address converting means, for designating the conversion of the read address signals during the transfer period; and write address conversion designating means, coupled to said block address converting means, for designating the conversion of the write address signals during a period different from said transfer periods.

6. A system according to claim 5, wherein said block address converting means further comprises block address storing means for storing a block address conversion pattern as a plurality of patterns each representing a series of block address for sequentially accessing a respective block area of said page data storage means, the block address corresponding to one of different conversion patterns which are designated by said write and said read address conversion designating means.

7. A system according to claim 5, wherein said block address converting means further comprises:

basic block address storage means for storing a basic block address for each block address conversion pattern, said basic block address storage means being accessed by said write conversion pattern designating means and said read conversion pattern designating means; and block address calculating means for calculating the block address in accordance with the basic block address read out from said basic block address storage means, the readout basic block address corresponding to the block address conversion patterns which are designated by said write address conversion designating means and said read address conversion designating means.

8. A system according to claim 5, further comprising:

means for detecting whether or not read access of data of a given area of said page data storage means which is accessed by each block address is completed and for supplying write data to be written in a completely read area; and selector means for selecting one of said write address conversion pattern designating means and said read address conversion pattern designating means, coupling a selected one thereof to said block address converting means, and designating a conversion pattern from a read address signal during data reading.

* * * * *